Patented Feb. 17, 1942

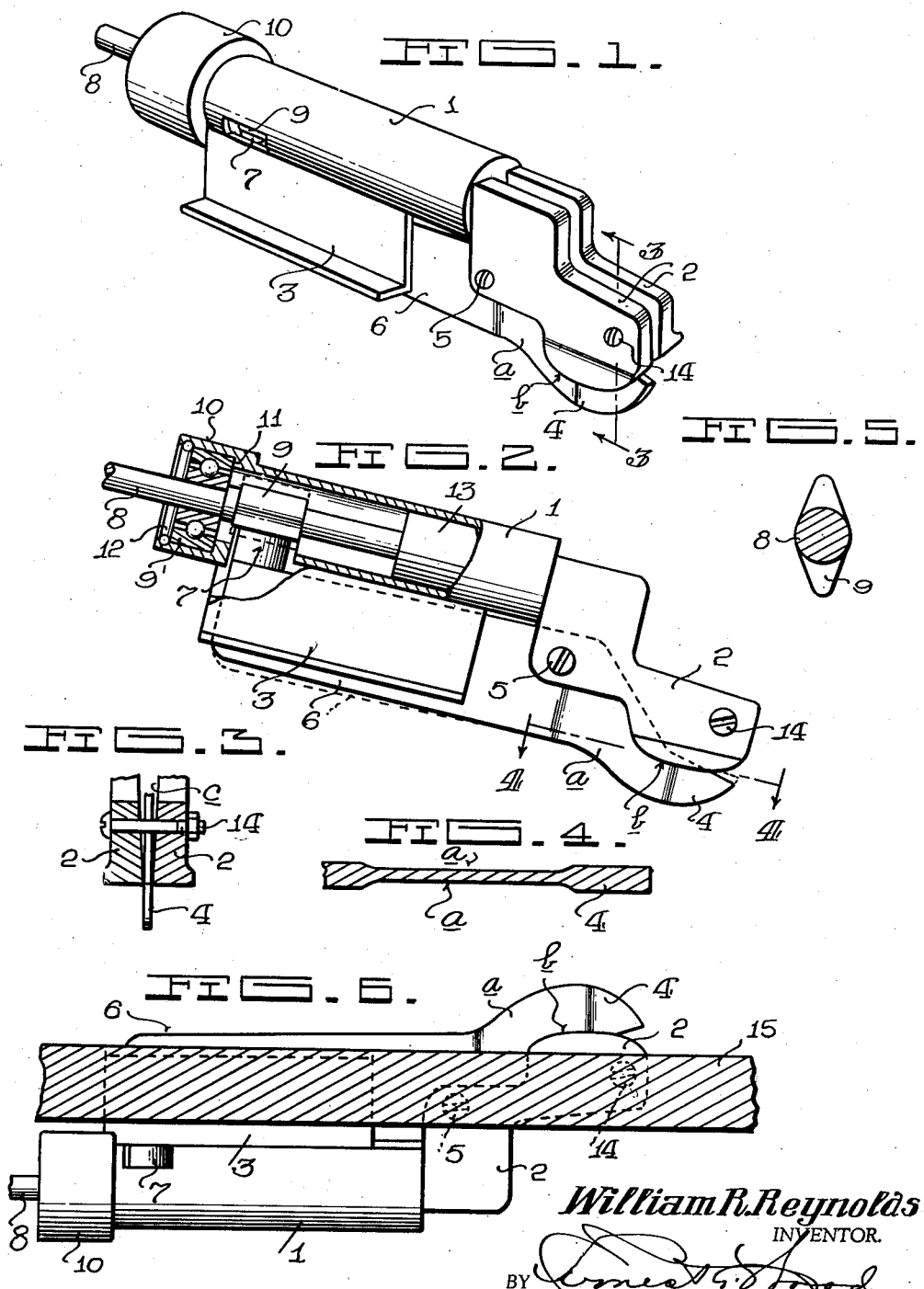

2,273,376

UNITED STATES PATENT OFFICE 2,273,376

CUTTING TOOL

William R. Reynolds, Dallas, Tex.

Application May 6, 1940, Serial No. 333,461

6 Claims. (Cl. 30—247)

This invention relates to cutting tools and more particularly to power operated devices for cutting sheet metal in manufacturing and repairing automobile and airplane bodies and for many other uses where sheet metal is employed.

The principal object of the invention is to provide a cutter by which the metal can be smoothly severed, leaving no burrs or ripples along the severed edges, which feature renders the operation of welding more facile due to the fact that no preliminary straightening of the contiguous edges will be required and further, a speedier and more pleasing job can be produced.

Another object of the invention is to provide a tool which may be applied in close places, such as cutting out inner door panels of automobile bodies to gain access to the inner surface of the exterior metal door or body coverings for smoothing out dents.

Broadly, the invention provides either a portable or stationary cutter of simple, inexpensive and durable construction wherein is provided certain adjustments for wear, with readily replaceable parts which may become inoperative for any reason.

With the foregoing objects as paramount, the invention refers further to certain salient features of construction and arrangement of parts to become manifest as the description proceeds, taken in connection with the accompanying drawing, wherein:

Figure 1 is a perspective view of a tool constructed according to the present invention.

Figure 2 is a side elevational view thereof with portions broken away.

Figure 3 is a detail end view, partly in section on line 3—3 on Figure 1.

Figure 4 is a fragmentary view of the minor cutting blade, taken on line 4—4 on Figure 2.

Figure 5 is a detail view of the blade actuating cam, showing the operating shaft in section, and Figure 6 shows the same tool, illustrating its use as a stationary cutter.

Continuing with a more detailed description of the drawing, 1 designates a barrel or cylindrical body, the forward portion of which is shaped to define relatively spaced, parallel major cutting jaws or blades 2. These stationary major blades, as they will be hereinafter called, may be made separate from the handle or body 1 if so desired, although they are shown as an integral part of the body.

Depending from the body is a pair of spaced plates 3, serving as shields for the minor cutting blade 4 which is interposed therebetween. The minor cutting blade is pivoted to the major cutting blades by means of a pin or bolt 5, extending entirely through both the major and minor blades. The minor cutting blade 4 has a tail portion 6 extending toward the rear of the body and is provided with a projection or cam follower 7, to which further reference will be made presently.

Extending into the body 1 is an operating shaft 8, on which is turned a double lobed cam 9. The lobes of this cam are in alignment with and successively engage the cam follower 7, which action will pivot the blade 4 at a rapid rate of speed, thereby moving the forward or cutting end of the blade relative to the companion or major blades between which it operates, consequently severing the material disposed between the major and minor blades.

A frictionless bearing 9' is mounted on the shaft 8 and is disposed in the housing 10 formed on the rear end of the body 1. The shoulder 11 in the housing affords an abutment for the bearing on one side while a lock ring 12 retains the bearing in position in the housing. A relief bearing 13 of bronze or other suitable material is arranged in the body as shown in Figure 2 and retains the inner end of the shaft 8.

It is preferred that the shaft 8 be so constructed as to be received in the bit chuck of an electrically driven hand drill for portability. This method of operation is highly efficient where the tool is to be employed in cutting metal in automobile bodies, airplanes and the like and where cuts are to be made in places inaccessible to other and less effective tools such as cold chisels, saws and even torches. As stated previously, a clean, smooth cut, devoid of burrs and ripples is a desideratum in severing the metal, especially of automobile bodies where it is necessary to rejoin the severed edges by welding. Cuts made by means such as defined above produce irregular edges which are required to be straightened before a suitable weld can be made. The time required for this is saved through the use of the invention.

Immediately behind the cutting edge of the minor cutting blade 4, there is provided a depression $a$ on either side of the blade. These depressions are produced by milling out the highly tempered material of the blade and are effective in relieving the blade of much of the friction which would otherwise be present between the blade and the edges of the cut. Moreover, by thus providing a slight clearance where the blade contacts the material, a curved cut can be made more readily as it allows the blade to be moved sidewise slightly to guide the same along a curve.

It is also to be noted that much of the wear imposed on the tool will be borne by the under surfaces $b$ of the major blades 2 and such wear, however slight, will be taken up by tightening the screw 14 near the tips of the blades 2. Due to the inward convergence of the confronting walls of the blades at $c$ (Figure 3), the desired amount of tension can always be maintained on the moving blade 4 and should any wear cause a widening of the space between the blades 2 at the bottom or in the event increased friction is desired, tightening of the screw 14 will reduce the space and thus tighten the blade 4.

In some cases, especially in cutting sheet aluminum for manufacturing and repairing airplane bodies and the like, it has been found that much better results can be had by stationarily mounting the tool, such as by countersinking the same in a table or work bench 15, as suggested in Figure 6. No change in construction of the tool is required in order to thus mount the cutter. It will be seen that the sheet of material, not shown, however flexible it may be, may be supported by the table and accurately guided between the cutting blades of the tool. The same or similar power means may be provided with convenient switch means for controlling the electric current.

Manifestly, the construction as shown and described is capable of some modification and such modification as may be construed to fall within the scope and meaning of the appended claims is also considered to be within the spirit and intent of the invention.

What is claimed is:

1. A cutting tool including a tubular body having a pair of relatively spaced, parallel stationary blades at its forward end, a movable cutting blade interposed between said first blades and cooperating therewith, said movable blade having a tail portion extending along said body, a power driven shaft extending into said body and cam means carried by said shaft and rotatably engageable with said tail portion to effect movement of said movable blade relative to said stationary blades whereby to remove from the work a strip equalling the width of said movable blade.

2. A cutting tool including a body bifurcated at one end to define relatively parallel major blades, a minor blade pivoted for movement intermediate and relative to said major blades and cooperating therewith, an actuating shaft therefor and means carried by said shaft for rapidly moving said minor blade on its pivot.

3. A tool for cutting sheet material comprising a body bifurcated at one end to define major cutting blades, a minor cutting blade pivotally interposed between said major cutting blades and cooperating therewith, said minor blade having a tail portion, a power actuated shaft extending into said body and means carried by said shaft for rotatable engagement with said tail portion to impart to said minor blade a reciprocatory motion relative to said major blades.

4. A tool for cutitng sheet metal comprising a body having parallel stationary blades at one end, a blade pivotally disposed between said stationary blades and cooperating therewith, said pivotally mounted blade having an elongated tail portion, a power driven operating shaft extending into said body and a cam carried by said shaft for successively engaging said tail portion to actuate said pivotally mounted blade on its pivot effective to remove from said sheet metal a strip of predetermined width.

5. A cutting tool comprising a body, stationary cutting blades arranged at the forward end thereof, spaced apart and having inwardly convergent confronting walls, a cutting blade pivotally mounted between said stationary blades and cooperating therewith, said cutting blade having a tail portion, means for adjusting the spacing of said stationary blades to vary the tension on said pivoted blade, an operating shaft and means carried by said shaft for actuating said pivoted blade relative to said stationary blades.

6. A cutting tool comprising a pair of parallel spaced apart stationary blades, a movable blade mounted for reciprocatory motion between said parallel stationary blades and cooperating therewith, and means to reciprocate said movable blade between said stationary blades to cut a strip equal to the width of said movable blade.

WILLIAM R. REYNOLDS.